United States Patent
Deolalikar et al.

(10) Patent No.: US 7,966,358 B2
(45) Date of Patent: Jun. 21, 2011

(54) DETERMINING AN APPROXIMATE NUMBER OF INSTANCES OF AN ITEM FOR AN ORGANIZATION

(75) Inventors: Vinay Deolalikar, Palo Alto, CA (US); Kave Eshghi, Palo Alto, CA (US); Pankaj Mehra, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1004 days.

(21) Appl. No.: 11/880,135

(22) Filed: Jul. 20, 2007

(65) Prior Publication Data

US 2009/0024682 A1    Jan. 22, 2009

(51) Int. Cl.
*G06F 1/02* (2006.01)
(52) U.S. Cl. .................................................... 708/250

(58) Field of Classification Search ........... 708/250–256
See application file for complete search history.

(56) References Cited

U.S. PATENT DOCUMENTS

2005/0262183 A1 * 11/2005 Colrain et al. ............... 709/200
* cited by examiner

*Primary Examiner* — Tan V Mai

(57) ABSTRACT

Embodiments of the present invention pertain to determining an approximate number of instances of an item for an organization. According to one embodiment, instances of items that reside on computer systems associated with the organization are determined. Instances of the same item can reside on different computers and an identification uniquely identifies an item. Random numbers are associated with identifications of the items. An approximate number of instances of the item is determined based on a highest random number associated with the item. The highest random number is the highest of the random numbers that were generated for the instances of the item.

20 Claims, 5 Drawing Sheets

DATASTRUCTURE 100

| FILE NAME | RANDOM NUMBER |
|---|---|
| Foo | 0.30 |
| Bar | 0.60 |
| Sam | 0.41 |
| May | 0.70 |

FIG. 1

# DETERMINING AN APPROXIMATE NUMBER OF INSTANCES OF AN ITEM FOR AN ORGANIZATION

TECHNICAL FIELD

Embodiments of the present invention relate to determining an approximate number of instances of an item for an organization.

BACKGROUND ART

Frequently organizations want to determine how many copies of each document reside on the various computer systems used by people in the organization or want to determine the number of copies of the most frequently occurring documents. Conventionally, the copies of documents have been counted. In large organizations, counting the copies there are of each document or determining the number of copies of the most frequently occurring documents takes a significant amount of time. For example, at any given point in time, some of the computer systems would be shut off due to people not being at work, among other things. Therefore, enough time would have to be allowed to gather information from all of the computer systems. Further, counting copies of documents has conventionally required a significant amount of processing power and memory. Lastly, conventional methods have been prone to duplication sensitivity where a particular copy of a document is counted more than once.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a diagram of a data structure for random number to instance pairs that reside on one computer system, according to one embodiment.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of various embodiments of the present invention, numerous specific details are set forth in order to provide a thorough understanding of the present invention. In other instances, well-known methods, procedures, components, and circuits have not been described in detail as not to unnecessarily obscure aspects of the present invention.

Overview

According to one embodiment, an approximate number of instances of an item for an organization is determined quickly without actually counting all of the instances of the item. An item could be a document and an instance could be a copy of the document. Embodiments can be used in distributed systems where copies of documents reside on many different computer systems where there is no central server to count instances of an item.

Figure 2:
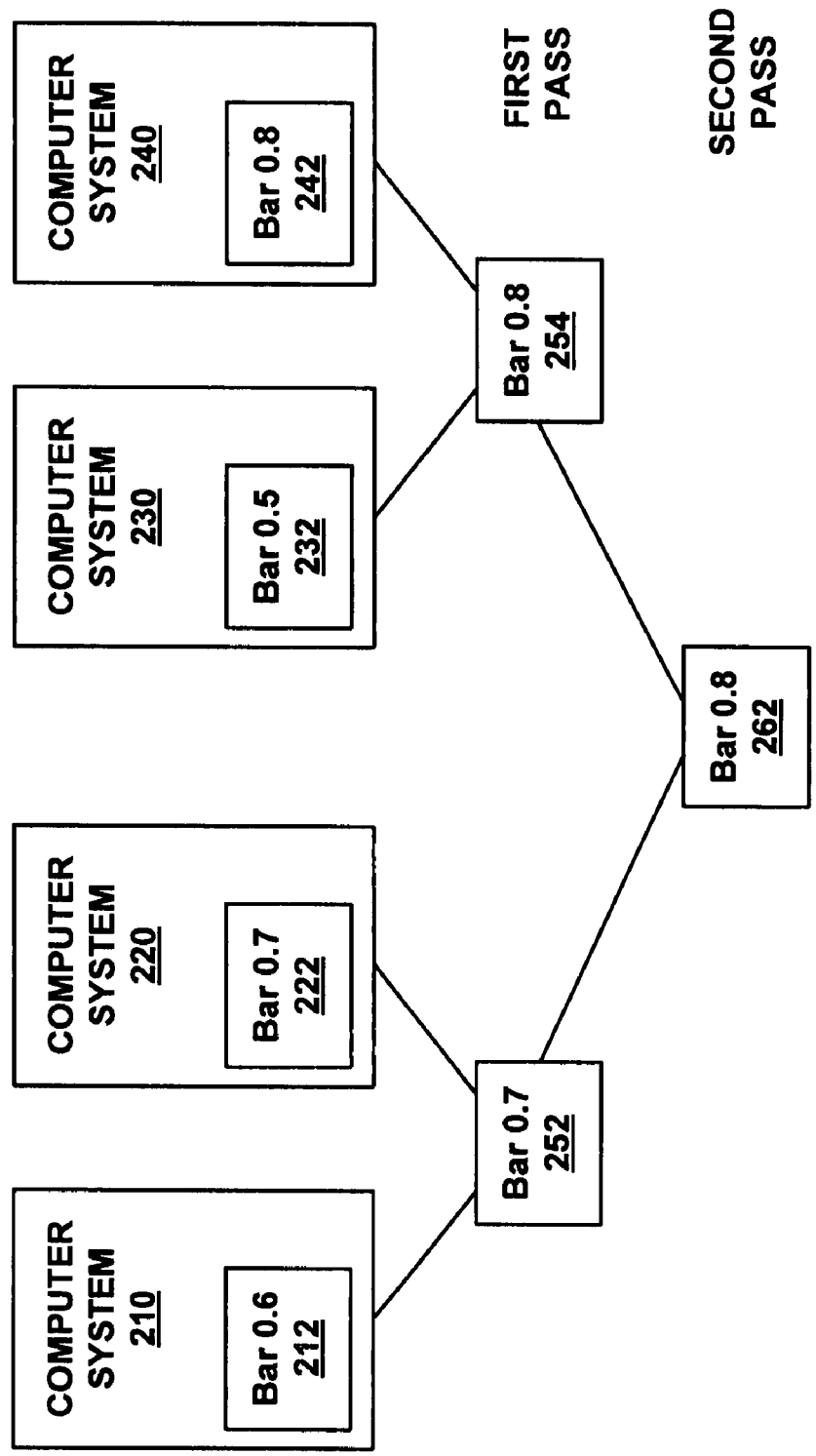
FIG. 2 depicts a block diagram of computer systems associated with an organization with their respective random number to instance pairs, according to one embodiment.
Figure 3:
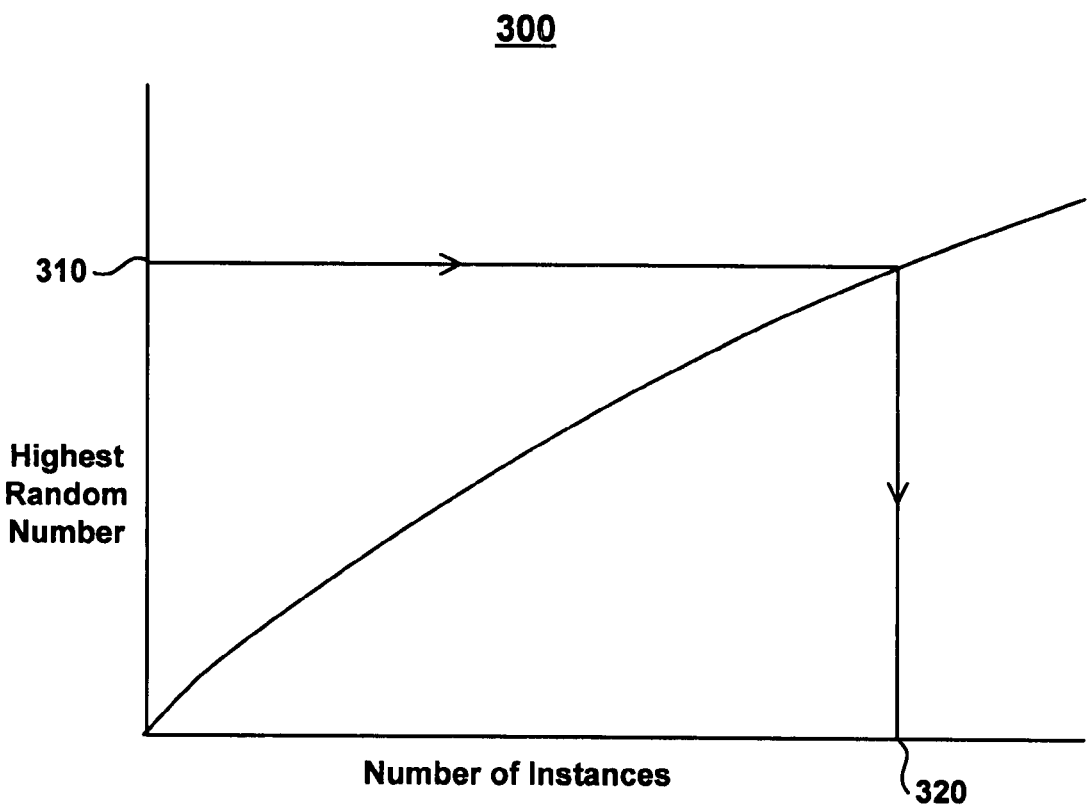
FIG. 3 depicts a graph of highest values to numbers of instances, according to one embodiment.

Order statistics are used to approximate the numbers of instances, according to one embodiment. For example, a principle of order statistics is that the larger a sample of random numbers is, the higher the highest value associated with that sample will be. In other words, the highest value associated with a sample of 5 random numbers will be higher than the highest value associated with a sample of 3 random numbers. Each computer system in an organization pairs a random number with each instance of an item, as depicted in FIG. 1, according to one embodiment. The computer systems can communicate their random number to instance pairs to each other and eliminate all but the highest value each time the computer systems communicate their random number to instance pairs to each other (also referred to as "a pass"), as depicted in FIG. 2. Typically, the highest value for all instances in an organization will be determined after approximately 4-5 passes. The approximate number of instances for a particular item can be determined using a graph of highest values to numbers of instances as depicted in FIG. 3.

Items and Instances of Items

Examples of items include but are not limited to documents, files, and portions of data, among other things. Copies of the same item may reside on many different computer systems associated with an organization. A copy of an item shall also be referred to as "an instance." An identification is used to uniquely identify each item so that instances of the same item have the same identification, according to one embodiment. For example, the name of a document can be used as an identification of a document. Each copy of that document on the various computers may have the same name.

Although identifications that are file names were used to describe many of the embodiments, any type of identification can be used for uniquely identifying an item. For example, an identification may, among other things, be a numeric, an alphabetic, an alphanumeric, may include special characters, or a combination thereof. Also for example, an identification may be derived from the contents of a document.

Random Numbers

Order statistics is used to approximate the numbers of instances, according to one embodiment. For example, a principle of order statistics is that the larger a sample of random numbers is, the higher the highest value associated with that sample will be. Table 1 and the accompanying description are provided to demonstrate that the larger a sample is, the higher the highest value will tend to be.

Table 1 depicts examples of samples that include 3, 5 and 7 random numbers.

| Sample Size | Random Numbers associated with the Sample |
|---|---|
| 3 | 0.3, 0.5, 0.61 |
| 5 | 0.25, 0.33, 0.51, 0.61, 0.75 |
| 7 | 0.18, 0.22, 0.37, 0.46, 0.52, 0.81 |

The highest value associated with the sample of size 3 is 0.61, the highest value associated with the sample of size 5 is 0.75 and the highest value associated with the sample of size 7 is 0.81. Note that 0.61 (from sample of size 3)<0.75 (from the sample of size 5)<0.81 (from sample of size 7). In other words with high probability, the expected value of the highest random number, which in this illustration is 0.81, associated with the sample of size 7 is higher than the expected value of the highest random number, which in this illustration is 0.75, associated with the sample of size 5 which in turn is higher than the expected value of the highest random number, which in this illustration is 0.61, associated with the sample of size 3.

According to one embodiment, the highest value associated with a sample is used to approximate the size of a sample. For example, the number of instances of an item is analogous to the size of a sample. Assume that the size of the sample (or the number of instances of an item) is not known, however, the highest random number for the sample is known. The highest random number can be used to approximate the number of instances of an item. Continuing the example, the highest random number 0.81 could be used to determine that there are approximately 7 instances of an item, as will become more evident.

Although many of the embodiments were described using the highest random number of a sample, the various embodiments are well suited using the lowest random value of the sample to estimate the sample size as well.

Random Number to Identications of Instance Pairs

According to one embodiment, a random number is generated for each instance of an item associated with computer systems used by an organization. FIG. 1 is a diagram of a data structure 100 for random number to instance pairs that reside on one computer system, according to one embodiment. File names are used as identifications of copies (instances) of documents (items) that reside on a particular computer system. The file names are Foo, Bar, Sam and May. Random numbers are generated and associated with each of the instances. For example, the random number 0.30 is associated with Foo, the random number 0.60 is associated with Bar, the random number 0.41 is associated with Sam, and the random number 0.70 is associated with May.

Computer Systems

According to one embodiment, the computer systems associated with an organization are a part of a distributed system. Examples of computer systems include but are not limited to laptop computers, desktop computers, servers, mainframe computers and so on. Each computer system associated with an organization can create a data structure 100, as depicted in FIG. 1, pairing random numbers with identifications of instances of items that reside on each of those computer systems. FIG. 2 depicts a block diagram of computer systems 210, 220, 230 and 240 associated with an organization with their respective random number to instance pairs. For example, computer system 210 includes a data structure 212 that pairs an instance of bar with a random number 0.6. Computer system 220 includes a data structure 222 that pairs an instance of bar with a random number of 0.7. Computer system 230 includes a data structure 232 that pairs an instance of bar with a random number of 0.5 and computer system 240 includes a data structure 242 that pairs an instance of bar with a random number of 0.8. The data structures 212-242, 252, 254 and 262 are examples of a data structure 100.

For the sake of simplicity, the data structures 212-242, 252, 254 and 262 are depicted with one random number to instance pair. However, the data structures 212-242, according to various embodiments, would potentially include random number to instance pairs for all of the instances of items that reside on the respective computer systems 210-240.

The computer systems 210-240 can communicate their respective data structures 212-242 to each other, for example, using message passing. For example as a part of a first pass, assume that computer system 220 transmits its data structure 222 to computer system 210. Computer system 210 can compare the random number 0.6 associated with its data structure 212 and the random number 0.7 associated with computer system 220's data structure 222 to determine which random number for bar is higher. 0.7 is higher than 0.6, so according to one embodiment, the value of 0.7 is retained and the random number 0.6 is eliminated resulting in data structure 252. Similarly, computer system 240 can transmit its data structure 242 to computer system 230, which can determine that the value 0.8 is higher than the value 0.5 for bar resulting in data structure 254. In a second pass, computer system 230 can transmit its current data structure 254 which includes a random value of 0.8 for bar to computer system 210. Computer system 210 can compare the random number 0.7 associated with its current data structure 252 to the random number 0.8 associated with data structure 254, resulting in data structure 262 which includes the highest random number 0.8 for all instances of bar associated with an organization.

The data structures 212, 222, 232, 242, 252, 254, and 262 are not necessarily different pieces of memory. For example, two or more "data structures" may use the same piece of memory but have different values associated with them. For example, data structures 212 and 252 may use the same memory but have different values 0.6 or 0.7 associated with the item Bar.

Although various embodiments are described herein where data structures are transmitted from one distributed computer system to another distributed computer system and the various distributed computer systems determine which random number is higher for a particular instance, various embodiments are well suited for use with a centralized server. For example, the various computer systems 210-240 could transmit their respective data structures 212-242 to a centralized server which determines the highest random numbers for each item.

Message Passing

The computer systems 210-240 can use various message passing algorithms to determine which computer systems 210-240 to transmit their respective data structures to. Examples of message passing algorithms include but are not limited to "nearest neighbor" and "random addressing." A computer system using the nearest neighbor algorithm may determine which computer systems are nearest to it, for example, in terms of geographical locations or work organization. A computer system using random addressing may generate random addresses, for example based on employees' work phone numbers.

Although many of the embodiments were described herein with a computer system transmitting its data structure to one computer system, computer systems may transmit their data structures to more than one computer system. For example, each computer system associated with an organization may transmit their data structure to four other computer systems.

Message passing is well suited to a distributed computing environment. According to one embodiment, the highest random number generated for all of the instances of an item can be determined in 4-5 passes.

Determining an Approximate number of Instances Based on a Graph

FIG. 3 depicts a graph of the expected value of the highest values to numbers of instances, according to one embodiment. In other words, if one were to repeatedly draw a sample of size n from a distribution, and each time note the highest value in the sample, then the average of these highest values would tend towards the value in the graph. A random number generator could generate samples of various sizes. The graph could be used to determine an approximate number of instances 320 based on a known highest random number 310. Continuing the example, assume that the highest random number 310 for bar is 0.8. Also assume that the approximate number of instances 320 for a random number 310 of 0.8 is 1000. The graph depicted in FIG. 3 could be used to determine that there are approximately 1000 instances of Bar when the highest random number for Bar is 0.8.

Threshold

According to one embodiment, a threshold is used to reduce the size of the data structures that are transmitted between computer systems. The threshold also reduces the amount of computing performed by each computer system. To illustrate how a threshold can be used, assume that an organization is only interested in determining the number of instances of items where there are at least 500 instances per item. The graph depicted in FIG. 3 could be used to determine that the highest random number for 500 instances is 0.58. The threshold may be set to a number, such as 0.50, that is for example slightly lower than 0.58.

The instances with random numbers below the threshold are eliminated from a data structure, according to one embodiment. For example, referring to the data structure 100 depicted in FIG. 1. Foo with a random value of 0.30 and Sam with a random number of 0.41 could be eliminated from the data structure 100 based on the threshold of 0.58. Similar processing could be performed on each computer system associated with an organization, for example, before these computer systems transmit their respective data structures to other computer systems.

A threshold can be set in various ways to accomplish different goals, according to one embodiment. For example, a threshold may be set to determine an approximate number of instances when an organization has no idea of how many instances of items there are. In this case, an organization may set the threshold assuming that there are at least 10 instances of an item. In another example, a threshold may be set to determine the most frequently occurring documents. In this case, an organization may estimate that there are at least 1000 instances of their more frequently occurring documents and set the threshold based on there being at least 1000 instances of an item. Various embodiments can be used to determine an approximate number of instances for an item with or without using a threshold.

Occurs More than Once Bit

It is possible that an abnormally high random number is generated the first time a random number is generated for a particular item. In this case, the approximate number of instances would appear to be artificially high. Therefore, according to one embodiment, a third column may be associated with the data structure 100 to determine that at least two random numbers have been generated for a particular item. For example, assume that the "occurs more than once bits" for Foo, Bar, Sam and May are initially set to 0. Assume that the data structure 100 is transmitted to another computer which also has an instance of bar. The bit for bar would be set to 1 indicating that there are at least two instances of bar, according to one embodiment. At the end of processing, when for example, the highest random number for all of the instances of items associated with an organization have been determined, these bits can be analyzed to determine whether there are at least two instances of the respective items. Random numbers associated with items that have at least two instances are treated as valid, according to one embodiment.

According to one embodiment, after all of the pairs received by a computer system are pruned so that there is only one pair for each identifier (the chosen pair for each identifier being the one that has the highest value of the random number), there is an additional pruning step where the collection of random number to identifier pairs are sorted, regardless of the identifier, using the following order relation: If the value of the "occurred more than once bit" is 1 in one pair and 0 in the other, then the first pair is treated as higher than the second. If the value of the "occurred more than once bit" is the same in the two pairs, then the pair whose random value is higher than the other is considered higher than the other. Having sorted the pairs using this scheme, the top "k" pairs, where k is a predetermined threshold, are communicated to other computer systems, using message passing as described herein. For example, if the threshold is 100, and there are 1000 pairs after the first pruning steps, these pairs are sorted by the above relation, and the top 100 pairs are communicated to other computer systems. The identifier of the pairs may be different. This scheme enables finding the most common items without having to propagate a pair for each item.

Figure 4:
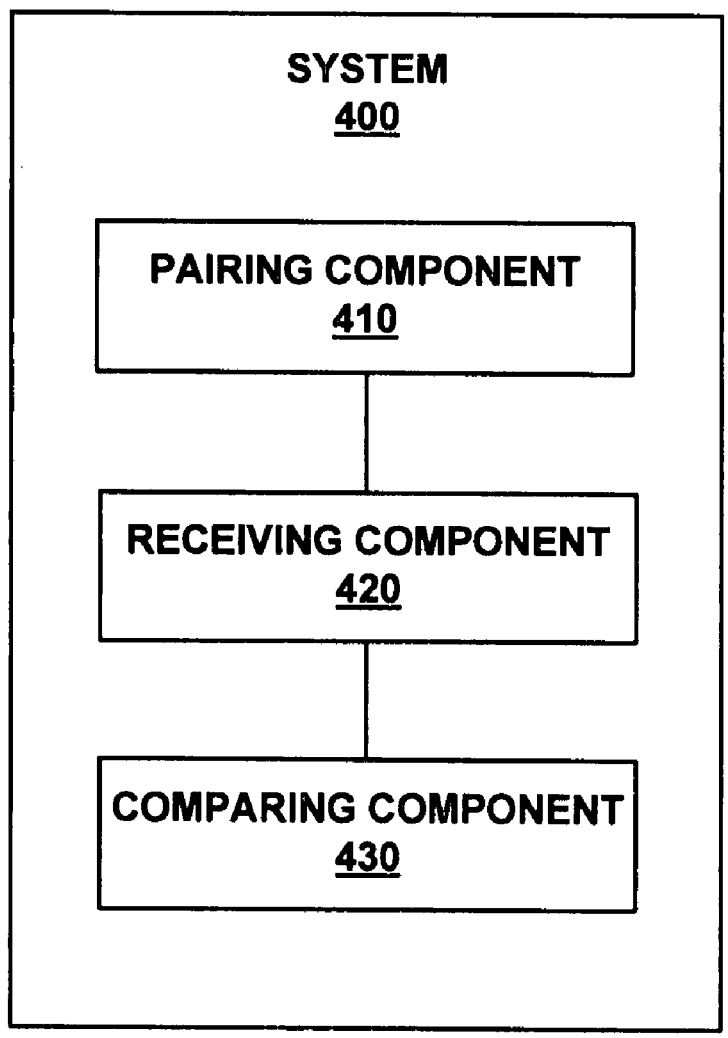
FIG. 4 depicts a block diagram of a system for enabling determination of an approximate number of instances of an item for an organization, according to one embodiment.

A System for Enabling Determination of an Approximate Number of Instances of an Item for an Organization FIG. 4 depicts a block diagram of a system for enabling determination of an approximate number of instances of an item for an organization, according to one embodiment. The blocks depicted in FIG. 4 represent features of the system 400. The blocks that represent features in FIG. 4 can be arranged differently than as illustrated, and can implement additional or fewer features than what are described herein. Further, the features represented by the blocks in FIG. 4 can be combined in various ways. The system 400 can be implemented using software, hardware, firmware, or a combination thereof.

The system 400 includes a random-number-to-identification-pairing-for-approximating-number-of-instances-component 410 (also referred to herein as a "pairing component"), a random-number-receiving-for-approximating-number of-instances-component 420 (also referred to herein as a "receiving component"), and a random-number-comparing-for-approximating-number-of-instances-component 430 (also referred to herein as a "comparing component"). The pairing component 410 is coupled to the receiving component 420 which is coupled to the comparing component 430. The pairing component 410 is configured for associating a first random number with an identification of an instance of an item. The instance resides on a first computer system associated with the organization and the identification uniquely identifies instances of the item that reside on different computer systems associated with the organization. The receiving component 420 is configured for receiving from a second computer system associated with the organization a second random number that is associated with the identification of the instance. The comparing component 430 is configured for comparing the first random number to the second random number to determine which is the higher of the two random numbers whereby a determination of an approximate number of instances of the item associated with the organization is enabled.

Figure 5:
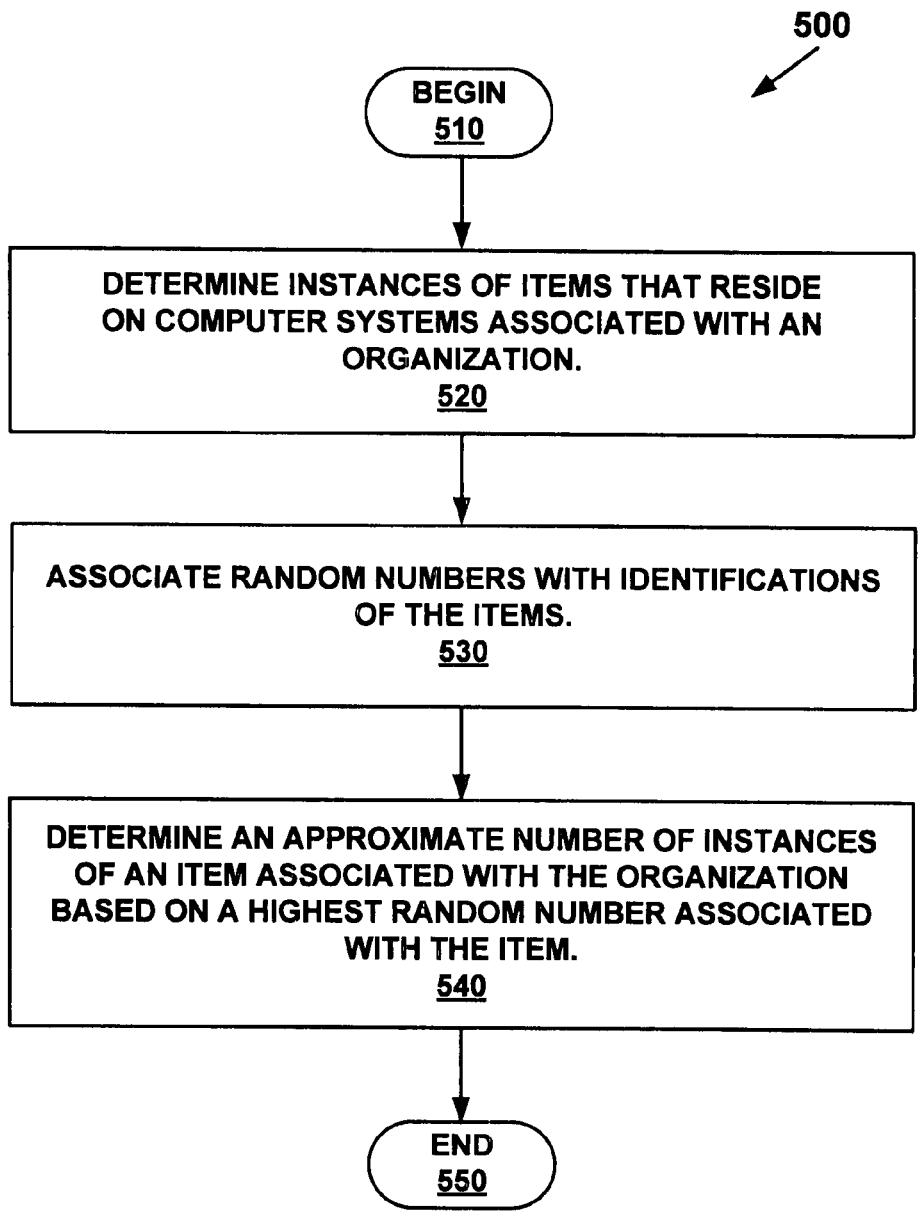
FIG. 5 is a block diagram of a method of determining an approximate number of instances of an item for an organization, according to one embodiment.

A Method of Determining an Approximate Number of Instances of an Item for an Organization FIG. 5 is a block diagram of a method of determining an approximate number of instances of an item for an organization, according to one embodiment. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed.

All of, or a portion of, the embodiments described by flowchart 500 can be implemented using computer-readable and computer-executable instructions which reside, for example, in computer-usable media of a computer system or like device. As described above, certain processes and steps of the present invention are realized, in an embodiment, as a series of instructions (e.g., software program) that reside within computer readable memory of a computer system and are executed by the processor of the computer system. When executed, the instructions cause the computer system to implement the functionality of the present invention as described below.

Assume for the sake of illustration, that a system 400 resides on each of the computer systems associated with an organization.

In step 510, the method begins.

In step 520, instances of items that reside on computer systems associated with an organization are determined. For example, referring to FIG. 1, one computer system associated with an organization has instances of foo, bar, sam and may. The file names foo, bar, sam and may are used to uniquely identify the files. Other copies (instances) of Foo, Bar, Sam and May may reside on other computer systems. However, each copy can be uniquely identified by their file names.

In step 530, random numbers are associated with identifications of the items. A pairing component 410, according to one embodiment, pairs random numbers with identifications of items that are described in step 530. For example, referring to FIG. 1, the random numbers 0.30, 0.60, 0.041 and 0.70 are generated and associated with the respective identifications Foo, Bar, Sam and May. The processing described for steps 520 and 530 may be performed by all of the computer systems 210-240 associated with an organization so that each computer system 210-240 has a data structure 212-242 as depicted in FIG. 2.

A threshold can be used to eliminate entries from a data structure. For example, assume that an organization knows that they are only interested in documents that have at least 500 copies in the organization. Also referring to FIG. 3, assume for the sake of illustration that the number of instances 320 that corresponds to a highest random number of 500 is 0.58. A threshold of 0.50, which is slightly lower than 0.58, may be used to eliminate entries from a data structure. In this example, the entries for Foo and Sam would be eliminated from data structure 100 because their respective random numbers 0.30 and 0.41 are lower than the threshold 0.50. Similar processing could be performed on all of the computer systems 210-240 associated with an organization when data structures 212-242 are initially created or when the computer systems 210-240 compare random numbers between data structures 212-242,252, 254 and 262, or a combination thereof.

In step 540, an approximate number of instances of an item associated with the organization is determined based on a highest random number associated with the item. For example referring to FIG. 2, the computer systems 210-240 may communicate their respective data structures 212-242, 252, 254 and 262 to each other using message passing. A receiving component 420 associated with any of the computer systems 210-240 can receive data structures from another computer system selected from computer systems 210-240. Computer system 220 may communicate its data structure 222 to computer system 210 and computer system 240 may communicate its data structure 242 to computer system 230.

Comparing components 430 associated with computer systems 210 and 230 can compare random values associated with their own data structures 212, 232 and to random numbers associated with received data structures 222, 242 to determine which random number is higher. For example, computer system 210 will determine that the random number 0.7 from data structure 222 is higher than the random number 0.6 from data structure 212, resulting in data structure 252. Computer system 230 can perform similar processing to determine that the random number 0.8 associated with data structure 242 is higher than the random number 0.5 associated with data structure 232, resulting in data structure 254.

According to one embodiment, a computer system 210-240 sets the "occurred more than once bit" the first time a computer system 210-240 compares random numbers associated with different data structures for the same item. For example, when computer system 210 receives computer system 220's data structure 222 and detects that its data structure 212 and computer system 220's data structure 222 both have an entry for bar, computer system 210 can set the "occurred more than once bit" associated with Bar in data structure 252 to indicate that there are more than one instance of Bar for the organization.

The data structures continue to be transmitted between computer systems until a final data structure 262 that includes the highest random numbers for the instances of items is created. The random numbers associated with this final data structure 262 can be used to determine approximate numbers of instances for example using a graph 300 as depicted in FIG. 3.

In step 550, the method ends.

CONCLUSION

Various embodiments are well suited for determining an approximate number of instances of items that exist in a distributed computing environment, for example, because the various embodiments can result in a fast and light weight implementation. For example, the amount of computing performed by each computer system in a distributed computing environment is very low and can be performed quickly. Further, analysis has shown that the highest random number for all instances of a particular item can be determined in 4-5 passes even in very large organizations. By comparing actual counts to approximate numbers determined using various embodiments, analysis has shown that the approximate numbers of instances determined using various embodiments are very accurate.

There has been a long term felt need for various embodiments of the present invention. To date, there have been no methods or systems for approximating the number of instances of items associated with an organization that has a distributed computing environment in a manner that are fast, accurate, or does not require large amounts of computation or large amounts of memory.

Conventional methods of counting or approximating the number of instances of items have been prone to counting the same instance of an item more than once. In contrast, embodiments of the present invention can be used to avoid counting the same instance of an item more than once.

Although many of the embodiments were described in terms of random numbers being generated between the values of 0 and 1, other methods of fixing a probability distribution can be used.

Although many of the embodiments were described in terms of documents and copies of documents, various embodiments are well suited for systems that backup portions of data. For example, various embodiments can be used for determining the rare instances portions of data, making sure the more commonly occurring portions of data are backed up and not continuing to back the more commonly occurring portions of data over and over.

Various embodiments have been described in various combinations. However, any two or more embodiments may be combined. Further, any embodiment may be used separately from other embodiments.

Embodiments of the present invention are thus described. While the present invention has been described in particular embodiments, it should be appreciated that the present invention should not be construed as limited by such embodiments, but rather construed according to the following claims.

What is claimed is:

1. A computer implemented method of determining an approximate number of instances of an item for an organization, the method comprising:
   determining, by a computer system, instances of items that reside on computer systems associated with the organization, wherein instances of the same item reside on different computers and wherein an identification uniquely identifies an item;
   associating random numbers with identifications of the items, by said computer system; and
   determining an approximate number of instances of the item based on a highest random number associated with the item, by said computer system, wherein the highest random number is highest of random numbers that were generated for the instances of the item.

2. A computer implemented method as recited in claim 1, wherein the method further comprises:
   using message passing to communicate the identifications of the items and the random numbers associated with the identifications between two or more of the computer systems.

3. A computer implemented method as recited in claim 1, wherein the method further comprises:
   eliminating an identification of a particular item and a random number associated with the particular item's identification based on a threshold.

4. A computer implemented method as recited in claim 1, wherein the method further comprises:
   communicating random number to instance pairs between two or more computer systems; and
   eliminating lower one of every pair of random numbers corresponding to match identifications each time the computer systems communicate their random number to instance pairs between each other.

5. A computer implemented method as recited in claim 1, wherein the method further comprises:
   setting an occurs-more-than-once-bit when a computer system detects that more than one instance of a particular item exists for the organization.

6. A computer implemented method as recited in claim 1, wherein the determining the instances of the items that reside on the computer systems further comprises:
   performing the determining of instances on the computer systems, wherein the computer systems are associated with a distributed computing environment.

7. A system for enabling determination of an approximate number of instances of an item for an organization, the system comprising:
   random-number-to-identification-pairing-for-approximating-number-of-instances-component configured for associating a first random number with an identification of an instance of an item, wherein the instance resides on a first computer system associated with the organization and wherein the identification uniquely identifies instances of the item that reside on different computer systems associated with the organization;
   random-number-receiving-for-approximating-number of-instances-component configured for receiving from a second computer system associated with the organization a second random number that is associated with the identification of the item; and
   random-number-comparing-for-approximating-number-of-instances-component configured for comparing the first random number to the second random number to determine which is the higher of the first and second random numbers whereby a determination of an approximate number of instances of the item associated with the organization is enabled.

8. The system of claim 7, wherein the system resides on computer systems associated with a distributed computing environment.

9. The system of claim 8, wherein the system uses message passing to communicate random number to identification pairs between the computer systems associated with the distributed computing environment.

10. The system of claim 8, wherein the system is associated with each of the computer systems in the distributed computing environment and wherein comparing random numbers for instances of a particular item is performed on various computer systems until the highest random number for all instances of the particular item is determined.

11. The system of claim 7, wherein the system eliminates a random number and an associated identification of an item based on a threshold.

12. The system of claim 7, wherein the system compares two random numbers for the same item and eliminates the random number that is the lower of the two random numbers.

13. The system of claim 7, wherein the system sets an occurs-more-than-once-bit when the system detects that more than one instance of the item exists for the organization.

14. The system of claim 7, wherein the system determines the approximate number of instances of the item based on a graph of highest random numbers to number of instances.

15. A tangible computer-readable storage medium having computer-readable program code embodied therein for causing a computer system to perform a method of determining an approximate number of instances of an item for an organization, the method comprising:
- determining instances of items that reside on computer systems associated with the organization, wherein instances of the same item reside on different computers and wherein an identification uniquely identifies an item;
- associating random numbers with identifications of the items; and
- determining an approximate number of instances of the item based on a lowest random number associated with the item, wherein the lowest random number is lowest of random numbers that were generated for the instances of the item.

16. The tangible computer-readable storage medium of claim 15, wherein the computer-readable program code embodied therein causes a computer system to perform the method, and wherein the method further comprises:
- determining identifications of items to random number pairs on computer systems associated with a distributed computing environment;
- transmitting the pairs to a centralized server; and
- comparing on the centralized server random numbers for a particular item to determine a lowest random number for all of the random numbers associated with the particular item.

17. The tangible computer-readable storage medium of claim 15, wherein the computer-readable program code embodied therein causes a computer system to perform the method, and wherein the method further comprises:
- using message passing to communicate the identifications of the items and the random numbers associated with the identifications between two or more of the computer systems.

18. The tangible computer-readable storage medium of claim 15, wherein the computer-readable program code embodied therein causes a computer system to perform the method, and wherein the method further comprises:
- eliminating a particular identification of a particular item and a random number associated with the particular identification based on a threshold.

19. The tangible computer-readable storage medium of claim 15, wherein the computer-readable program code embodied therein causes a computer system to perform the method, and wherein the random number is a first random number and wherein the method further comprises:
- receiving at a first computer a second random number that is associated with the identification for the item from a second computer; and
- retaining the lower of the first random number and the second random number.

20. The tangible computer-readable storage medium of claim 15, wherein the computer-readable program code embodied therein causes a computer system to perform the method, and wherein the determining of the approximate number of the particular item further comprises:
- determining the approximate number of instances of the item based on a graph of lowest random numbers to number of instances.

* * * * *

UNITED STATES PATENT AND TRADEMARK OFFICE
CERTIFICATE OF CORRECTION

| | | |
|---|---|---|
| PATENT NO. | : 7,966,358 B2 | Page 1 of 1 |
| APPLICATION NO. | : 11/880135 | |
| DATED | : June 21, 2011 | |
| INVENTOR(S) | : Vinay Deolalikar et al. | |

It is certified that error appears in the above-identified patent and that said Letters Patent is hereby corrected as shown below:

In column 10, line 34, in Claim 7, delete "number of" and insert -- number-of --, therefor.

Signed and Sealed this
Twentieth Day of March, 2012

David J. Kappos
*Director of the United States Patent and Trademark Office*